US011785979B2

(12) United States Patent
Hufnagel et al.

(10) Patent No.: US 11,785,979 B2
(45) Date of Patent: Oct. 17, 2023

(54) WAX ENCAPSULATED ZEOLITE FLAVOUR DELIVERY SYSTEM FOR TOBACCO

(71) Applicant: PHILIP MORRIS PORDUCTS, S.A., Neuchatel (CH)

(72) Inventors: Jan-Carlos Hufnagel, Singapore (SG); Monika Christlbauer, Gauting (DE); Irene Chetschik, Zurich (CH); Reiner Daiminger, Maribor (SI); Marcus Petermann, Witten (DE); Andreas Kilzer, Witten (DE); Zeljko Knez, Maribor (SI); Zoran Novak, Lovrenc na Pohorju (SI); Amra Perva Uzunalic, Maribor (SI); Simon Henske, Bochum (DE); Neven Tutnjević, Bistrica ob Sotli (SI); Radoslav Jonak, Vojnik (SI); Andrej Nose, Smarje Sap (SI); Urban Fegus, Celje (SI)

(73) Assignee: Philip Morris Products S.A., Neuchâtel (CH)

( * ) Notice: Subject to any disclaimer, the term of this patent is extended or adjusted under 35 U.S.C. 154(b) by 827 days.

(21) Appl. No.: 15/104,110

(22) PCT Filed: Dec. 18, 2014

(86) PCT No.: PCT/IB2014/067098
§ 371 (c)(1),
(2) Date: Jun. 13, 2016

(87) PCT Pub. No.: WO2015/092749
PCT Pub. Date: Jun. 25, 2015

(65) Prior Publication Data
US 2017/0119041 A1    May 4, 2017

Related U.S. Application Data

(60) Provisional application No. 61/919,059, filed on Dec. 20, 2013.

(30) Foreign Application Priority Data

Dec. 20, 2013 (EP) .................................. 13198865

(51) Int. Cl.
*A24B 15/28* (2006.01)
*A24B 15/42* (2006.01)
(Continued)

(52) U.S. Cl.
CPC ............. *A24B 15/283* (2013.01); *A23G 4/20* (2013.01); *A23L 27/72* (2016.08); *A23L 27/77* (2016.08);
(Continued)

(58) Field of Classification Search
CPC ..... A24B 15/283; A24B 15/167; A24B 15/42; A24B 15/286; A24B 15/282; A24B 15/00;
(Continued)

(56) References Cited

U.S. PATENT DOCUMENTS 3,203,432 A * 8/1965 Green .................... A24B 3/14
131/375
3,894,544 A * 7/1975 Egri ....................... A24B 3/14
131/370
(Continued)

FOREIGN PATENT DOCUMENTS

CN    1442096 A    9/2003
EP    0419974 B1   12/1996
(Continued)

OTHER PUBLICATIONS

International Preliminary Report on Patentability for PCT/IB2014/067098, issued by the International Bureau of WIPO, dated Jun. 30, 2016; 8 pgs.
(Continued)

*Primary Examiner* — Michael H. Wilson
(74) *Attorney, Agent, or Firm* — Mueting Raasch Group

(57) ABSTRACT

A flavour delivery system for tobacco includes a flavour material entrained in a zeolite material and forming a core and a wax material encapsulating the core.

16 Claims, 8 Drawing Sheets

Figure 1:
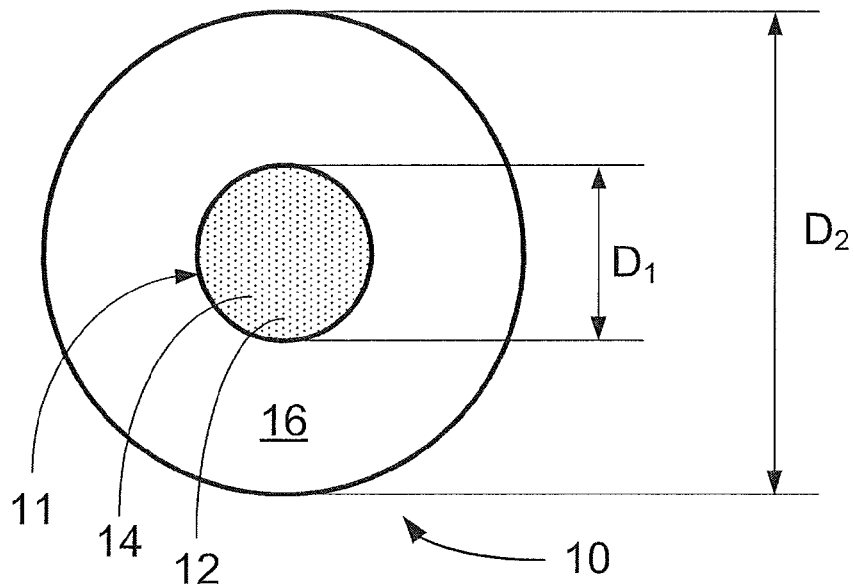

(51) Int. Cl.
*A23G 4/20* (2006.01)
*A23L 27/00* (2016.01)
*A24B 15/167* (2020.01)

(52) U.S. Cl.
CPC .......... *A24B 15/167* (2016.11); *A24B 15/286* (2013.01); *A24B 15/42* (2013.01)

(58) Field of Classification Search
CPC .. A24B 15/14; A23G 3/30; A23G 4/20; A23L 27/77; A23L 27/72; A24D 1/02; D21H 11/00; D21H 13/00; D21H 15/00; D21H 17/00; D21H 19/00; D21H 21/00; D21H 23/00; D21H 25/00; D21H 27/00; A24F 47/00
USPC .................. 131/365, 276, 278, 277, 279
See application file for complete search history.

(56) References Cited

U.S. PATENT DOCUMENTS

| | | | | | |
|---|---|---|---|---|---|
| 4,597,970 | A | * | 7/1986 | Sharma | A23G 4/02 426/453 |
| 4,722,845 | A | * | 2/1988 | Cherukuri | A23G 4/06 426/5 |
| 4,978,537 | A | * | 12/1990 | Song | A23G 4/02 426/303 |
| 5,251,649 | A | * | 10/1993 | Cho | A24B 3/182 131/291 |
| 5,724,998 | A | * | 3/1998 | Gellatly | A24B 3/14 131/372 |
| 6,056,791 | A | * | 5/2000 | Weidner | A61K 9/1688 159/2.1 |
| 7,032,601 | B2 | * | 4/2006 | Atchley | A24B 13/00 131/352 |
| 7,866,325 | B2 | * | 1/2011 | Woods | A24B 15/282 131/276 |
| 7,998,494 | B2 | * | 8/2011 | Holzner | A61K 8/11 424/400 |
| 8,852,350 | B2 | * | 10/2014 | Sampson | A24D 1/02 131/274 |
| 2003/0045446 | A1 | * | 3/2003 | Dihora | C11D 3/38672 510/320 |
| 2003/0098033 | A1 | | 5/2003 | Macadam et al. | |
| 2003/0168071 | A1 | * | 9/2003 | Han | A24D 3/06 131/360 |
| 2004/0129280 | A1 | | 7/2004 | Woodson | |
| 2004/0191366 | A1 | * | 9/2004 | Mangos | A23G 4/20 426/89 |
| 2005/0000531 | A1 | * | 1/2005 | Shi | A24B 15/28 131/347 |
| 2007/0204869 | A1 | * | 9/2007 | Sampson | A24D 1/02 131/274 |
| 2007/0267033 | A1 | * | 11/2007 | Mishra | A24B 15/283 131/275 |
| 2008/0092912 | A1 | * | 4/2008 | Robinson | A24F 47/008 131/200 |
| 2008/0279947 | A1 | | 11/2008 | Nowak et al. | |
| 2009/0269447 | A1 | * | 10/2009 | Brimmer | A23L 7/109 426/96 |
| 2012/0192881 | A1 | * | 8/2012 | Dahan | A24C 5/608 131/309 |
| 2013/0206151 | A1 | * | 8/2013 | Besso | A24B 15/283 131/275 |

FOREIGN PATENT DOCUMENTS

| | | |
|---|---|---|
| EP | 0519696 B1 | 11/1998 |
| GB | 983928 A2 | 2/1965 |
| JP | 2003-304856 A | 10/2003 |
| JP | 2007-259864 A | 10/2007 |
| JP | 2008-533260 A | 8/2008 |
| KR | 10-0155148 B1 | 10/1998 |
| KR | 20080005588 | 1/2008 |
| KR | 10-1072668 B1 | 10/2011 |
| RU | 2067401 C1 | 10/1996 |
| WO | WO 91/17821 A1 | 11/1991 |
| WO | WO 1995/021688 A1 | 8/1995 |
| WO | WO 03/041521 A2 | 5/2003 |
| WO | WO 2004/052128 A2 | 6/2004 |
| WO | WO 2005/082180 A2 | 9/2005 |
| WO | 20060120570 | 11/2006 |

OTHER PUBLICATIONS

Russian Office Action for corresponding application No. RU 2016129454, issued by the Patent Office of the Russian Federation dated Jun. 26, 2018; including English Translation: 17 pgs.

International Search Report and Written Opinion for PCT/IB2014/067098, issued by the European Patent Office dated May 4, 2015; 11 pgs.

Korean Notice of Office Action for KR 10-2016-7014003, issued by the Korean Intellectual Property Office, dated Mar. 1, 2021; 14 pgs. including English Translation.

Korean Notice of Allowance for KR Application No. 10-2016-7014003, issued by the Korean Patent Office dated Jan. 5, 2022; 5 pgs. including English translation.

* cited by examiner

WAX ENCAPSULATED ZEOLITE FLAVOUR DELIVERY SYSTEM FOR TOBACCO

This application is the § 371 U.S. National Stage of International Application No. PCT/IB2014/067098, filed 18 Dec. 2014, which claims the benefit of U.S. Provisional Application No. 61/919,059, filed 20 Dec. 2013 and European Patent Application No. 13198865.1, filed 20 Dec. 2013, each of which are incorporated by reference herein.

This disclosure relates to flavour delivery systems for smoking articles, where the flavour material is entrained in a zeolite and encapsulated in wax. This flavour delivery system can be combined with tobacco for smoking articles.

Combustible smoking articles, such as cigarettes, typically have a tobacco substrate of shredded tobacco (usually in cut filler form) surrounded by a paper wrapper forming a tobacco rod. A cigarette is employed by a smoker by lighting one end of the cigarette and burning the tobacco rod. The smoker then receives mainstream smoke by drawing on the opposite end or mouth end of the cigarette, which typically contains a filter. These conventional cigarettes combust tobacco and generate temperatures that release volatile compounds into the mainstream smoke. To modify the flavour of the mainstream smoke, it is known to provide cigarettes with single and multi-segment mouthpiece filters that include flavourants, such as menthol.

A number of smoking articles in which an aerosol generating substrate, such as a tobacco substrate, is heated rather than combusted are known. Such articles may be termed aerosol generating articles. Examples of systems using aerosol generating articles include systems that heat a tobacco containing substrate above 200 degrees centigrade to produce a nicotine containing aerosol. Typically in such heated aerosol-generating articles, an inhalable aerosol is generated by the transfer of heat from a heat source to an aerosol-forming substrate or material, which may be located within, around or downstream of the heat source. During consumption of the aerosol-generating article, volatile compounds are released from the aerosol-forming substrate by heat transfer from the heat source and entrained in air drawn through the article. As the released compounds cool, they condense to form an aerosol that is inhaled by the consumer.

During the manufacture of these smoking articles the tobacco substrate is heated or dried to remove water, for example. During this heating or drying step volatile compounds, such as flavourants, are removed from the tobacco substrate, altering the taste of the smoking final article. Currently flavouring agents are sprayed onto the dried tobacco substrate and is termed "top loading". This procedure is difficult as dosage and final concentration of the flavour on the tobacco substrate can depend on environmental conditions and the design of the spraying unit. In addition, flavour can migrate to evolve from the tobacco substrate during storage. All of these factors can lead to unwanted product taste variability It would be desirable to improve the smoking article taste uniformity and storage stability of flavourings added to the tobacco substrate (tobacco rod or aerosol generating substrate).

Flavour delivery systems of the invention described herein can be utilized in conventional combustion smoking articles or in the aerosol generating substrate of aerosol generating smoking articles. The flavour delivery systems can provide a predictable and stable sustained release of flavour to smoking articles. This is especially useful when combined with aerosol generating substrates that are heated during production of the aerosol generating substrate.

As described herein, a flavour delivery system for tobacco includes a flavour material entrained in a zeolite and encapsulated in wax. Preferably the wax material has a melting point of about 100 degrees centigrade or greater. The flavour material can be a hydrophobic liquid. The zeolite material can be hydrophobic. Smoking compositions include the flavour delivery system and tobacco. Preferably the tobacco is a homogenized tobacco or cast leaf tobacco.

Various aspects of the flavour delivery system described herein may have one or more advantages relative to standard tobacco compositions. For example, the flavour delivery systems provide an enhanced flavour experience relative to tobacco compositions that do not include the flavour delivery system. The wax material and the zeolite material do not contribute to or change the flavour notes of the tobacco composition. The wax materials encapsulate the flavour entrained zeolite core to protect the flavour material during manufacture and storage of a smoking article that includes these tobacco compositions, while predictably releasing the flavour material during the consumption of the smoking article. Combining the flavour delivery system with tobacco material to form the tobacco composition also provides a uniform distribution of flavour material throughout the tobacco composition. The flavour delivery systems can replace or enhance the tobacco flavour notes that have been modified during the production of the aerosol generating substrate. In addition, the wax coating or shell surrounding or encapsulating the flavour entrained zeolite core can be a sacrificial layer that can operate as a thermal heat sink further protecting the core from releasing the flavour material during the manufacture or storage of the tobacco composition. Additional advantages of one or more aspects flavour delivery system described herein will be evident to those of skill in the art upon reading and understanding the present disclosure.

The term "wax material" refers to natural or synthetic wax products that are hydrophobic and can convert to a melt-liquid state (dropping point) at temperatures below 200 degrees centigrade and are virtually free of ash forming compounds.

The term "flavourant" or "flavour" refers to organoleptic compounds, compositions, or materials that alter the taste or aroma characteristics of a tobacco substrate during consumption thereof.

The term "zeolite material" refers to a silica based material that has a micro-porous structure. Typically zeolites are micro-porous, aluminosilicate minerals.

The term "smoking article" includes cigarettes, cigars, cigarillos and other articles in which a smokable material, such as a tobacco, is lit and combusted to produce smoke. The term "smoking article" also includes those in which the smoking composition is not combusted such as but not limited to smoking articles that heat the smoking composition directly or indirectly, without burning or combusting the smoking composition, or smoking articles that neither combust nor heat the smoking composition, but rather use air flow or a chemical reaction to deliver nicotine, flavour compound or other materials from the tobacco substrate.

As used herein, the term "smoke" or "mainstream smoke" is used to describe an aerosol produced by heating or combusting a tobacco substrate of a smoking article. An aerosol produced by a smoking article may be, for example, smoke produced by combustible smoking articles, such as cigarettes, or aerosols produced by non-combustible smoking articles, such as heated smoking articles including aerosol generating articles or non-heated smoking articles.

As used herein, the term "atomizing" denotes a process whereby a liquid, which may contain molten material, a solution, an emulsion, or a combination of these, is caused to flow through one or more orifices in a sprayer, and broken into droplets or particles.

The present disclosure provides flavour delivery systems for smoking articles. The flavour delivery system includes a flavour material entrained in a zeolite material forming a core. A wax material surrounds the core and forms an encapsulated core or a double encapsulated flavour material.

The flavour delivery system described herein provides an improved way in which to incorporate flavourants into a smoking article. The types of flavourants that are used in smoking articles are typically relatively volatile and it is difficult to retain acceptable levels of the flavourants within the smoking articles during manufacture and storage. The volatile flavourants may also migrate to other parts of the smoking articles and can adversely impact the performance of other components of the smoking article, such as any sorbents provided within the filter.

The flavour delivery system can controllably release a flavour or flavourant to its surrounding environment by increasing the temperature of the surrounding environment. The wax material forms a shell around the core. Preferably the wax material has a melting (dropping) point that is greater than about 100 degrees centigrade. The melting (dropping) point can be determined by using a standard test method for the dropping point of waxes known by ASTM D3954-94(2010).

The flavour or flavourant can be dispersed in the zeolite material. In many embodiments the flavour or flavourant is entrained in the zeolite material with supercritical carbon dioxide. The core particle can then be encapsulated with wax material to form an encapsulated core.

The core particle can be dispersed in the wax material when forming the encapsulated core. Preferably the core particle is dispersed in the wax material when the wax material is in the molten form. The encapsulated core particle can be formed by any useful method. Preferably the encapsulated core particle is formed by any useful method such as atomization by spray chilling of the molten wax and core particle blend.

Spray chilling provides for a more homogeneous particle size than, for instance, conventional spray drying. In addition, spray chilling reduces the amount of heat applied to the flavour thus reducing losses by evaporation or undesirable changes in the flavour material. Preferably spray chilling is performed with an inert gas such as carbon dioxide or nitrogen to further reduce conversion or undesirable changes to the flavour material.

Any useful zeolite material that can absorb a flavourant can be utilized to form the core particle. Numerous zeolites have been synthesized and numerous naturally occurring zeolites are known. Zeolites have been classified as "hydrophobic" or "dealuminised" zeolites. The degree of hydrophobicity is dictated by the Si/Al ratio. Zeolites with a high Si/Al ratio carry less framework charge and are commonly referred to as "hydrophobic" or "dealuminised"; the opposite is true for high alumina content zeolites which are labeled "hydrophilic". Some examples of hydrophobic zeolites include silicalite, mordenite and zeolite Y. One of the differences which exist between these zeolites lies in the size and availability of the pores present in the zeolite crystals. For example, silicalite and zeolite Y have three-dimensional pore systems which are easily accessible, while the pore system in mordenite is two-dimensional and is therefore less easily accessible. With respect to pore size, both zeolite Y and mordenite belong to the largest known groups of zeolites with pore size respectively about 7 and 7.5 A; silicalite has on the other hand, a pore diameter of about 5.5 A (see D. W. Breck, Zeolite Molecular Sieves, Wiley, New York, 1974). There is, however, a size limit to selective molecular adsorption by hydrophobic dealuminised zeolites, and in many cases, hydrophobic zeolites cannot adsorb molecules that are too large to fit into their micro-porous structure. Preferably the zeolite material is hydrophobic for flavour entrainment.

Illustrative hydrophobic zeolite materials are commercially available under the trade designation UK8 and UZ8 from Chemiewerk, Germany. Illustrative hydrophilic zeolite materials are commercially available under the trade designation 13X8 and 4A from Silkem, Slovenia.

In many embodiments, the zeolite material has a particle size of less than about 100 micrometers, or less than about 50 micrometers or less than about 20 micrometers. In many embodiments, the zeolite material has a particle size of greater than about 1 micrometer, or greater than about 5 micrometers or greater than about 10 micrometers Preferably the zeolite material has a particle size in a range from about 1 micrometer to about 50 micrometers or from about 1 to about 20 micrometers.

Flavourants can be impregnated into the zeolite micro-porous structure by any useful method. Preferably the flavourant is impregnated into the zeolite micro-porous structure via supercritical carbon dioxide impregnation. As illustrated in the examples below, a flavourant is dispersed in carbon dioxide at a temperature and pressure to form a single phase. This single phase impregnates the zeolite micro-porous structure to entrain the flavourant in the zeolite material.

Flavourants or flavours can be liquid or solid flavours (at room temperature of about 22 degrees centigrade and one atmosphere pressure) and can include flavour formulations, flavour-containing materials and flavour precursors. The flavourant may include one or more natural flavourants, one or more synthetic flavourants, or a combination of natural and synthetic flavourants. Preferably the flavour is a liquid. Preferably the flavour is a hydrophobic liquid.

The hydrophobic liquid flavour is generally soluble in organic solvents but only weakly soluble in water. Preferably, this hydrophobic liquid flavour is characterized by a Hildebrand solubility parameter smaller than 30 $MPa^{1/2}$. The aqueous incompatibility of most oily liquids can be in fact expressed by means of Hildebrand's solubility parameter 6 which is generally below 25 $MPa^{1/2}$, while for water the same parameter is of 48 $MPa^{1/2}$, and 15-16 $MPa^{1/2}$ for alkanes. This parameter provides a useful polarity scale correlated to the cohesive energy density of molecules. For spontaneous mixing to occur, the difference in 6 of the molecules to be mixed must be kept to a minimum. The Handbook of Solubility Parameters (ed. A. F. M. Barton, CRC Press, Bocca Raton, 1991) gives a list of 6 values for many chemicals as well as recommended group contribution methods allowing 6 values to be calculated for complex chemical structures.

Flavourants or flavours refer to a variety of flavour materials of natural or synthetic origin. They include single compounds and mixtures. Preferably the flavour or flavourant has flavour properties that enhance the experience of a non-combustible smoking article to, for example, provide an experience similar to that resulting from smoking a combustible smoking article. For example, the flavour or flavourant can enhance flavour properties such as mouth fullness and complexity. Complexity is generally known as the overall balance of the flavour being richer without dominating single sensory attributes. Mouth fullness is described as perception of richness and volume in the mouth and throat of the consumer.

Suitable flavours and aromas include, but are not limited to, any natural or synthetic flavour or aroma, such as tobacco, smoke, menthol, mint (such as peppermint and spearmint), chocolate, licorice, citrus and other fruit flavours, gamma octalactone, vanillin, ethyl vanillin, breath freshener flavours, spice flavours such as cinnamon, methyl salicylate, linalool, bergamot oil, geranium oil, lemon oil, and ginger oil, and the like.

Other suitable flavours and aromas may include flavour compounds selected from the group consisting of an acid, an alcohol, an ester, an aldehyde, a ketone, a pyrazine, combinations or blends thereof and the like. Suitable flavour compounds may be selected, for example, from the group consisting of phenylacetic acid, solanone, megastigmatrienone, 2-heptanone, benzylalcohol, cis-3-hexenyl acetate, valeric acid, valeric aldehyde, ester, terpene, sesquiterpene, nootkatone, maltol, damascenone, pyrazine, lactone, anethole, iso-s valeric acid, combinations thereof, and the like.

Further specific examples of flavours may be found in the current literature, for example, in Perfume and Flavour Chemicals, 1969, by S. Arctander, Montclair, N.J. (USA); Fenaroli's Handbook of Flavour Ingredients, CRC Press or Synthetic Food Adjuncts by M. B. Jacobs, van Nostrand Co., Inc. They are well-known to the person skilled in the art of flavouring, i.e. of imparting an odor or taste to a product.

In some embodiments, the flavourant is a high potency flavourant, and is typically used at levels that would result in less than 200 parts per million in the aerosol or mainstream smoke. Examples of such flavourants are key tobacco aroma compounds such as beta-damascenone, 2-ethyl-3,5-dimethylpyrazine, phenylacetaldehyde, guaiacol, and furaneol. Other flavourants can only be sensed by humans at higher concentration levels. These flavourants, which are referred to herein as the low potency flavourants, are typically used at levels that results in orders of magnitude higher amounts of flavourant released into the aerosol or mainstream smoke. Suitable low potency flavourants include, but are not limited to, natural or synthetic menthol, peppermint, spearmint, coffee, tea, spices (such as cinnamon, clove and ginger), cocoa, vanilla, fruit flavours, chocolate, eucalyptus, geranium, eugenol and linalool.

Some useful flavourants for the invention described herein area able to be impregnated into the zeolite material, preferably by combining the flavourant with supercritical carbon dioxide and the zeolite material. These flavourants include, for example, 3-methylbutanal, furfurylthiol, dimethyltrisulfide, 2-ethyl-3,5(6)-dimethylpyrazine, guajacol, 3-ethylphenol, or 4-isopropylphenol.

The flavour material in the core can be any useful amount. In many embodiments the flavour is present in the core in at least about 1 wt %. In many embodiments the flavour is present in the core in at less than about 50 wt %. In many embodiments the flavour is present in the core in a range from about 1 to about 50 wt %, or from about 1 to about 25 wt %, or from about 1 to about 10 wt %.

The core can have any useful particle size or largest lateral dimension. In many embodiments the core has a particle size of less than about 30 micrometres or less than about 20 micrometres. In many embodiments the core has a particle size greater than about 1 micrometre or greater than about 5 micrometres. In many embodiments the core has a particle size in a range from about 1 to about 30 micrometres, or from about 1 to about 25 micrometres, or from about 1 to about 20 micrometres.

Wax materials that are useful for encapsulating the core particles are chosen from among the group consisting of natural or synthetic waxes and mixtures thereof. Natural waxes are derived from animals, vegetables, minerals, and petroleum. Animal derived waxes include, for example, beeswax, Chinese wax, lanolin, shellac and spermaceti wax, and the like. Vegetable derived waxes include, for example, carnuba wax, candelilla wax, bayberry wax, sugar cane wax, castor wax, esparto wax, Japan wax, jojoba wax, ouricury wax, rice bran wax, soy wax, and the like. Mineral derived waxes include, for example, ceresin wax, montan wax, ozocerite wax, peat wax, and the like. Petroleum derived waxes include, for example, paraffin wax, petroleum jelly, microcrystalline wax, and the like. Synthetic waxes include, for example, polyethylene waxes, Fischer-Tropsch waxes, chemically modified waxes, substituted amide waxes, polymerized alpha-olefins, and the like.

Particularly useful wax materials do not alter the flavour of the tobacco substrate, have an appropriate melting or dropping point, flash point, fire point, polarity and are safe for consumption. The flash and fire point of the wax materials is particularly relevant when the flavour delivery system described herein is combined with tobacco and heated during the manufacturing of the tobacco substrate. It is preferred to utilize wax materials have a flash point and fire point that is greater than the temperatures applied to the wax materials during the manufacturing process. The flash point is the lowest temperature at which a flame will ignite the vapors of the heated excipient, while the fire point is the lowest temperature when the vapors ignite and burn for at least 2 seconds.

In many embodiments the wax material has a melting point of about 50 degrees or higher, or about 75 degrees or higher, or about 90 degrees or higher. Flavour can be released from the flavour delivery system as the wax material is heated above its melting point. In preferred embodiments, the flavour delivery system wax material has a melting point of about 100 degrees centigrade or greater, or about 120 degrees centigrade or greater, or about 140 degrees centigrade or greater, or about 150 degrees centigrade or greater. In many embodiments the wax material has a melting point in a range from about 100 degrees centigrade to 150 degrees centigrade or from about 110 degrees centigrade to about 140 degrees centigrade. In many embodiments the wax material has a melting point up to about 200 degrees centigrade.

Exemplary useful waxes include polyethylene waxes, polyethylene glycol waxes, or vegetable waxes. Illustrative polyethylene waxes are available under the trade designation CERIDUST from Clariant International Ltd., Switzerland. Illustrative polyethylene glycol waxes are available under the trade designation CARBOWAX from Dow Chemical Co., USA. Illustrative vegetable waxes are available under the trade designation REVEL from Loders Croklaan, Netherlands.

The use of the flavour delivery system described herein to provide a flavourant within a smoking article advantageously reduces the loss of the flavourant during storage so that a larger proportion of the flavourant is retained within the smoking article. The flavour delivery system can therefore provide a more intense flavour to the mainstream smoke. Since the loss of the flavourant is reduced, it is possible to incorporate a smaller amount of the flavourant into each smoking article whilst providing the same effect on the flavour as provided in current smoking articles.

The encapsulated core can have any useful particle size or largest lateral dimension. In many embodiments the encapsulated core has a particle size of less than about 200 micrometres or less than about 100 micrometres. In many embodiments the encapsulated core has a particle size greater than about 5 micrometres or greater than about 10 micrometres. In many embodiments the encapsulated core has a particle size in a range from about 5 to about 200 micrometres, or from about 5 to about 100 micrometres, or from about 5 to about 80 micrometres.

The core can be combined with the wax material in any useful amount to from the encapsulated core or flavour delivery system. In many embodiments the core represents at least about 1 wt % of the encapsulated core particle total weight. In many embodiments the core represents at least about 5 wt % of the encapsulated core particle total weight. In many embodiments the core represents less than about 50 wt % of the encapsulated core particle total weight. In many embodiments the core is represents a range from about 1 to about 50 wt % of the encapsulated core particle total weight, or from about 5 to about 50 wt % of the encapsulated core particle total weight, or from about 5 to about 25 wt % of the encapsulated core particle total weight.

The flavour delivery system can be combined with tobacco material to form a tobacco composition or smoking composition that provides a stable and predictable flavour release as the tobacco composition or smoking composition is heated to temperature to melt the wax material and release the flavour into the mainstream smoke or aerosol for consumption. The flavour delivery system can be combined with cut tobacco to form a tobacco composition or smoking composition for use with conventional combustion smoking articles. Preferably the flavour delivery system can be combined with reconstituted or homogenized tobacco to form a tobacco composition or smoking composition for use with aerosol generating articles. Preferably the homogenized tobacco is a cast leaf tobacco.

Smoking articles that include aerosol generating devices typically comprise an aerosol forming substrate that is assembled, often with other components, in the form of a rod. Typically, such a rod is configured in shape and size to be inserted into an aerosol generating device that comprises a heating element for heating the aerosol-forming substrate.

"Aerosol forming substrate" as used herein is a type of smoking composition that can be used in an aerosol generating device to produce an aerosol. The aerosol forming substrate can release a flavour compound upon combustion or heating. The substrate can comprise both liquid and solid components. The aerosol forming substrate may comprise tobacco and flavour delivery system wherein the flavour is released from the substrate upon heating. The aerosol forming substrate may further comprise an aerosol former. Examples of suitable aerosol formers are glycerine and propylene glycol. Optionally, the aerosol forming substrate may be provided on or embedded in a carrier which may take the form of powder, granules, pellets, shreds, spaghetti strands, strips or sheets. The aerosol forming substrate may be deposited on the surface of the carrier in the form of, for example, a sheet, foam, gel or slurry. The aerosol-forming substrate may be deposited on the entire surface of the carrier, or alternatively, may be deposited in a pattern in order to provide a non-uniform flavour delivery during use.

Homogenized tobacco can be used to make an aerosol generating substrate for use in smoking articles that are being heated in an aerosol-generating device. As used herein, the term "homogenized tobacco" denotes a material formed by agglomerating particulate tobacco. Tobacco dust created by tobacco breakage during shipping and manufacturing, leaf lamina, stems and other tobacco by-products that are finely ground may be mixed with a binder to agglomerate the particulate tobacco. Homogenized tobacco may comprise other additives in addition to a flavour composition or a flavour delivery composition, including but not limited to, aerosol-formers, plasticizers, humectants, and non-tobacco fibers, fillers, aqueous and non-aqueous solvents and combinations thereof. Homogenized tobacco can be cast, extruded, or rolled. A number of reconstitution processes for producing homogenized tobacco materials are known in the art. These include, but are not limited to: paper-making processes of the type described in, for example, U.S. Pat. No. 5,724,998; casting (cast leaf) processes of the type described in, for example, U.S. Pat. No. 5,724,998; dough reconstitution processes of the type described in, for example, U.S. Pat. No. 3,894,544; and extrusion processes of the type described in, for example, in GB983,928.

The flavour delivery system can be incorporated into the cast leaf tobacco substrate formed by a cast leaf process. This type of process is known as cast leaf process and is widely used by the tobacco industry for the manufacturing of reconstituted or homogenized tobacco for use in conventional cigarette. Cast leaf tobacco substrates can be formed by combining homogenized tobacco powder with water, glycerine, and other optional additives to form a slurry and combining the flavour delivery system in the slurry. The slurry is then cast into a form and dried (heated) to remove water and form the cast leaf tobacco substrate.

A cast leaf process may involve applying temperatures of up to about 140° C., such as between about 90° C. and 140° C. Accordingly, the wax material of the flavour delivery system is preferably stable at such temperatures. Preferably the wax material is stable at these temperatures so that the flavour is not released during the drying step of the cast leaf process. In many embodiments the wax material has a melting point that is substantially the same as the drying temperature of the drying step of the cast leaf process. In some embodiments the wax material has a melting point that is less than the drying temperature of the drying step of the cast leaf process. In these embodiments at least a portion of the shell or wax material melts away from or melts off the core and is dispersed within the homogenized tobacco material. Preferably the wax material has a melting point that is greater than the temperature used to form the cast leaf tobacco substrate.

All scientific and technical terms used herein have meanings commonly used in the art unless otherwise specified. The definitions provided herein are to facilitate understanding of certain terms used frequently herein.

As used herein, the singular forms "a", "an", and "the" encompass embodiments having plural referents, unless the content clearly dictates otherwise.

As used herein, "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising," and the like.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

FIG. 1, is a schematic diagram of an illustrative flavour delivery system 10 or encapsulated flavour core. The schematic drawing is not necessarily to scale and is presented for purposes of illustration and not limitation. The drawing depicts one or more aspects described in this disclosure. However, it will be understood that other aspects not depicted in the drawing fall within the scope and spirit of this disclosure.

Referring now to FIG. 1, the flavour delivery system 10 includes a flavour material 12 entrained in a zeolite material 14 forming a core 11 and a wax material 16 encapsulating the core 11.

The core 11 has a particle size or largest lateral dimension $D_1$. The flavour delivery system 10 has a particle size or largest lateral dimension $D_2$.

Non-limiting examples illustrating flavour delivery system as described above and tobacco substrates and smoking articles having such flavour delivery systems are described below.

EXAMPLES

A variety of wax materials were evaluated as described below for suitability in the flavour delivery system as described above.

Flash and fire points for selected wax excipients were determined according ISO 2592 (Cleveland open cup method). The flash point is the lowest temperature at which a flame will ignite the vapors of the heated excipient, while the fire point is the lowest temperature when the vapors ignite and burn for at least 2 seconds. It will be appreciated that the melting point in practice for the wax material will depend on for example any impurities or other components in the wax, as well as the pressure. Results of this testing (at ambient pressure) is reported in Table 1.

TABLE 1

| Wax | Type | Fire point (° C.) | Flash point (° C.) | Supplier | Melting point (° C.) |
|---|---|---|---|---|---|
| Rice bran (Kahlwax 2811) | Natural wax | 299 | 333 | Kahlwax/Kahlwax | 79-85 |
| Sunflower wax (Kahlwax 6607) | Natural wax | 305 | 335 | Kahlwax/Kahlwax | 74-80 |
| Carnauba wax (Kahlwax 2442L) | Natural wax | 315 | 345 | Kahlwax/Kahlwax | 82-86 |
| Candelilla wax (Kahlwax 2039) | Natural wax | 269 | 299 | Kahlwax/Kahlwax | 68-73 |
| Cutina wax | Hard Fat | 325 | 341 | CareChemicals | 83-88 |
| Licowax 521 PED | Polyethylene wax | 249 | >309 | Clariant/Parka d.o.o. | 101-106 |
| Ceridust 2051 | Polyolefin wax | 297 | 329 | Clariant/Parka d.o.o. | 108-116 |
| Ceridust 3610 | Polyethylene wax | 263 | >303 | Clariant/Parka d.o.o. | 125-130 |
| Deurex MX 9820 | Polypropylene wax | 277 | 329 | Deurex/Deurex | 110-118 |
| Deurex ME 1620 | Polyethylene wax | 261 | >321 | Deurex/Deurex | 122-130 |
| Deurex MT 9120 | Fischer-Tropsch wax | 295 | 339 | Deurex/Deurex | 112-120 |
| Sasolwax H1 | Fischer-Tropsch wax | 287 | 327 | Sasolwax/HDS Chemie | 112 |
| Sasolwax H105 | Fischer-Tropsch wax | na | Na | Sasolwax/HDS Chemie | 117 |
| Vestowax EH100 | Fischer-Tropsch wax | 267 | 295 | Evonik/Evonik | 102-110 |
| Vestowax SH105 | Fischer-Tropsch wax | 310 | 333 | Evonik/Evonik | 108-114 |
| PEG 6000 | Polymer | 233 | >259 | Merck | 55-60 |
| PEG 35000 | Polymer | 259 | >319 | Merck | 60-65 |
| Ceridust 6050M | Polypropylene wax | 271 | 319 | Cladant/Parka d.o.o. | 142-148 |
| Revel A | Hard fat | 319 | 347 | Loders Croklaan | — |

A sensory analysis of wax materials is determined using the descriptive criterion "overall sensory neutrality" to indicate intensity differences. As sensory and psychological fatigue sets in after 7-8 samples, a balanced incomplete block design (BiB) (ISO 29842) is selected for the ranking test (ISO 8587). Assessors receive per session five samples in random order and are asked to rank the samples according to the criterion. Four sessions are performed in order to achieve an adequate level of precision. Results of this BiB ranking are reported in Table 2.

TABLE 2

| | | BiB Ranking | |
|---|---|---|---|
| | | rank sum | 15D = 13 |
| 0 | Tixosil | 45 | A |
| I | Deurex MT 9120 | 37 | A B |
| | Sasolwax H1 | 35 | A B C |
| | Ceridust 3610 | 33 | A B C |
| | Ceridust 2051 | 33 | A B C |
| | Cutina HR | 33 | A B C |
| | Vestowax EH 100 | 32 | B C |
| II | Vestowax SH 105 | 28 | B C D |
| | Sasolwax H105 | 27 | B C D E |
| | Kahlwax 2811 (Rice Bran) | 27 | B C D E |
| III | Kahlwax 24421 (Carnauba) | 25 | B C D E F |
| | Kahlwax 2039 (Candelilla) | 23 | C D E F |
| IV | Deurex ME 1620 | 18 | D E F |
| | Deurex MX 9820 | 17 | D E F |
| | Licowax PED 521 GR | 15 | E F |
| | Kahlwax 6607 (Sunflower) | 14 | F |

A number of flavour delivery systems are formed by entraining a flavour in a zeolite material via supercritical carbon dioxide entrainment. Thus, the solubility of various flavourants in supercritical carbon dioxide is determined.

Flavour Phase Equilibra in $CO_2$

Phase behaviour observations are performed in a 62 mL high pressure view cell. Maximum operating pressure and temperature are 700 bar and 200° C. This view cell is equipped with a propeller stirrer enabling turbulent mixing. The view cell is heated by means of an electrical jacket connected to a thermoregulation unit (Eurotherm 2216e). The temperature inside the cell is measured by a thermocouple Ni—Cr (GTH 1150 Greisinger electronic, accuracy ±1.0° C.). The pressure is measured by a digital manometer (Wika, accuracy 0.1 bar), Liquid $CO_2$ is charged to the view cell by means of a high pressure pump (max. Pressure 600 bar).

Figure 2:
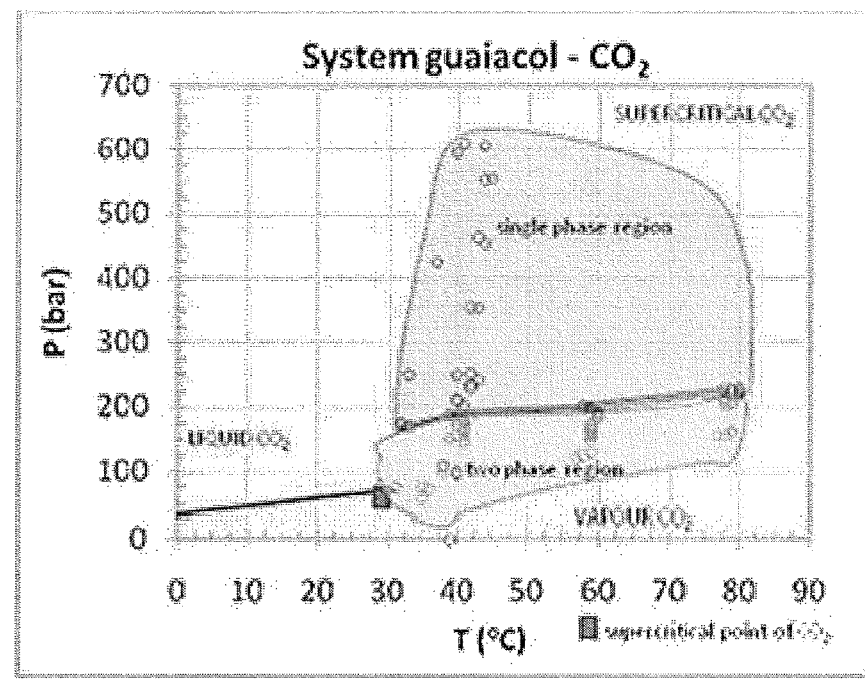

Phase equilibria observations are performed for the flavourant guaiacol in carbon dioxide in the pressure range from 50 to 500 bar at temperatures 40° C., 60° C. and 80° C. The 62 mL high pressure view cell was filled with 20 mL of guaiacol at room conditions. The operating conditions employed for observation of phase behavior are shown in FIG. 2, represented as circles.

Figure 3:
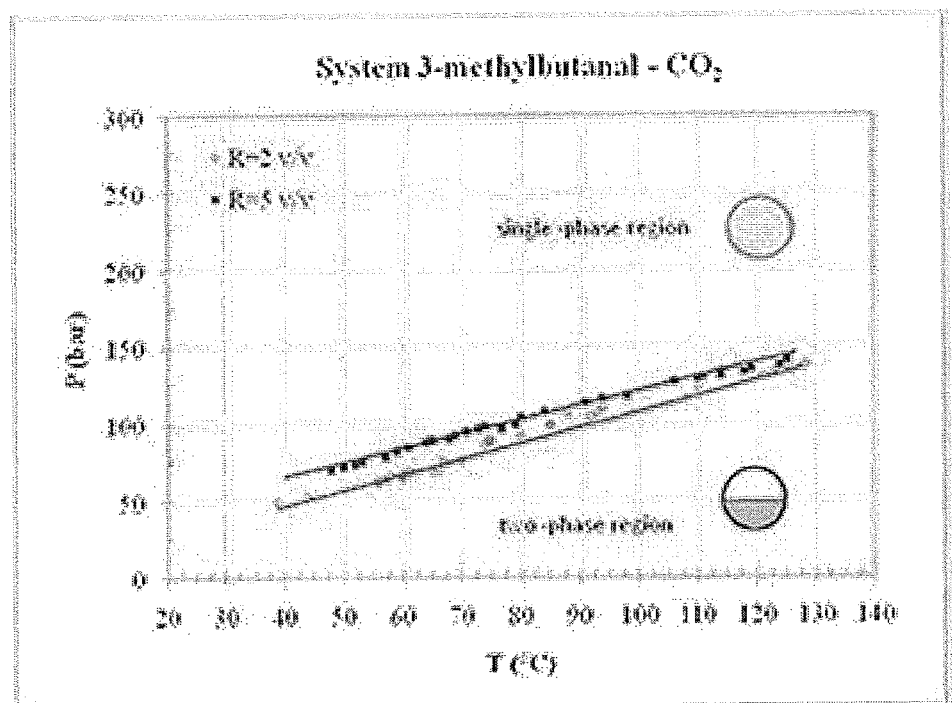

Phase equilibria observations are performed for the flavourant 3-methylbutanan in carbon dioxide. The mixture of 3-methylbutanal and $CO_2$ is first brought into a heterogeneous state (two phase region). The temperature is kept constant and the pressure slowly varied by changing the volume of the cell until the second phase disappeared. Phase transitions are determined visually. The phase transition line is constructed for two different volume ratios of $CO_2$—3-methylbutanal regarding the total maximum volume of the cell: 5 and 2 (v/v) and is shown in FIG. 3. It is observed in FIG. 3 that the solubility of CO2 in the liquid phase is relatively high, even at moderate pressures, which is indicated by the increase of liquid level in the binary system. There is a complete miscibility between $CO_2$ and 3-methylbutanal above the phase transition line—single phase region. The phase transition line for the binary system with higher ratio of $CO_2$:3-methylbutanal (R=5) lies slightly higher in comparison with ratio of 2.

Phase equilibria observations are performed for the flavourant "PMI Key" flavour mixture in carbon dioxide. The PMI Key flavour mixture is provided in the following Table 3 below.

TABLE 3

| compound | odor quality | MW in g/mol |
|---|---|---|
| guajacol | smoky | 124.14 |
| 3-ethylphenol | phenolic, leather | 122.16 |
| dimethyl trisulfide | cabbage-like, sulfury | 126.26 |
| 2-ethyl-3,6-dimethylpyrazine | earthy | 136.20 |
| 4-isopropylphenol | phenolic, plastic | 136.19 |
| 2-furfurylthiol | coffee-like | 114.17 |

Figure 4:
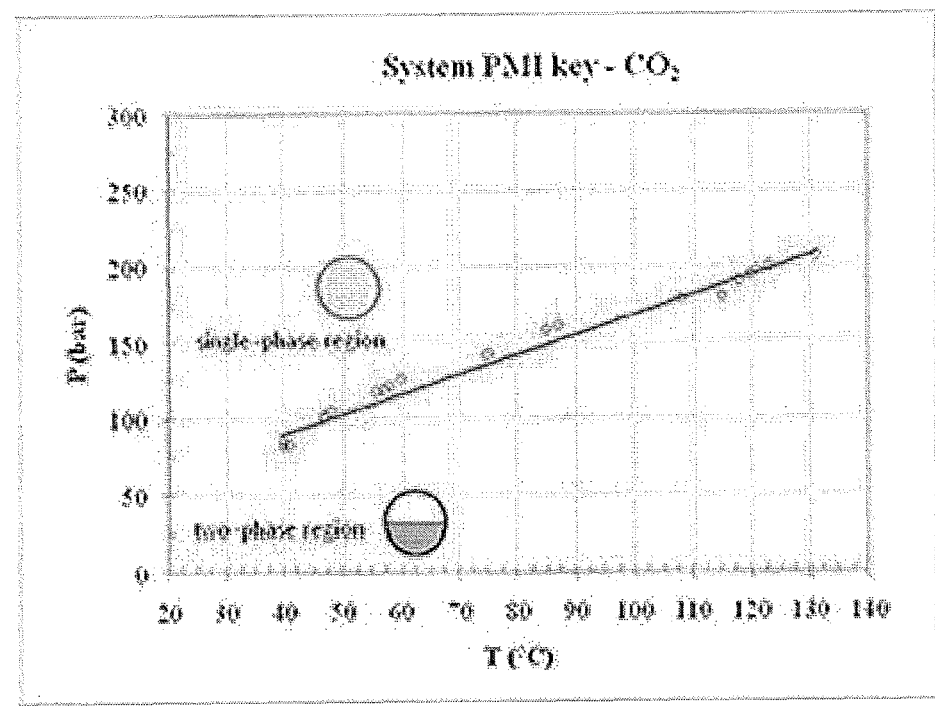

Phase behavior observations of the system PMI Key flavour mixture/$CO_2$ in the pressure range from 50 to 250 bar within temperature range between 40° C. and 130° C. is performed. The mixture of PMI key flavour and $CO_2$ is first brought into a heterogeneous state (two phase region). The temperature is kept constant and the pressure is slowly increased by changing the volume of the cell until the second phase disappeared. Phase transitions are determined visually. The phase transition line is constructed for ratio of $CO_2$:Flavour mixture key=5 (v/v) regarding the total maximum volume of the cell. It is observed that the phase transition line follows a linear trend. Results are presented in FIG. 4.

Zeolite Screening

Two different zeolite materials are used to cover the range of polarity of commercially available zeolites. As representative for hydrophilic zeolites the following materials were screened: 13X & 4A (SILKEM, Slovenia). As representative for hydrophobic zeolites the following materials were screened: UK8 & UZ8 (Chemiewerk, Bad Köstritz, Germany). Incorporation of the zeolites 13X and UZ8 into a cast leaf process at 3% wt and formed into a tobacco substrate are analysed for silicium in the aerosol generated by the tobacco substrate. The results show that silica could not be determined in the aerosol.

Flavour Release from Zeolite Core

Figure 5:
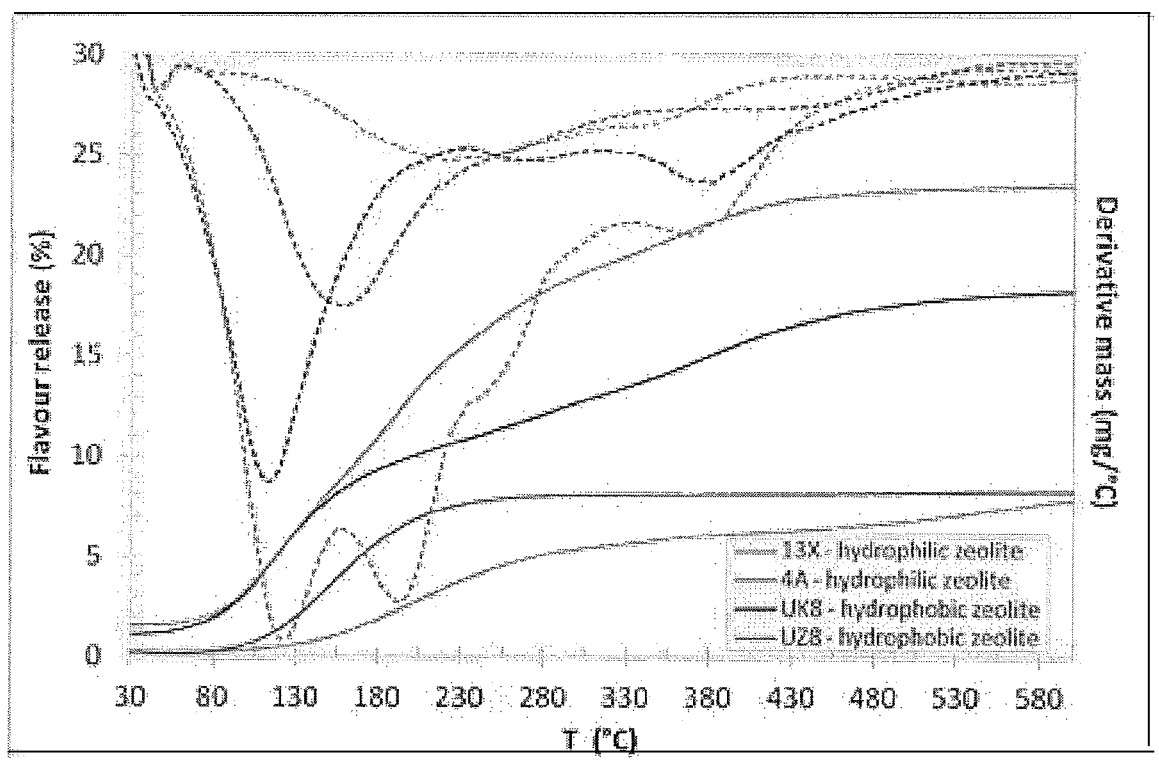

To evaluate whether the silica based material (zeolites) are capable of retaining and liberating flavour ingredients, zeolite materials loaded with flavour are evaluated for flavour loss by thermogravimetric analyses. FIG. 5 shows the results for the flavour release of different zeolites which may be used as core material. The flavour retention of hydrophilic zeolites is in a range of 7.7 to 8.2% whereas flavour retention of hydrophobic zeolites show a retention of flavour ingredients up to 23%. The release temperatures indicate that a core material is required to protect the flavour ingredients from unintended flavour release during the cast leaf process.

Evaluation of Core Shell Materials

The following Table 4 indicates the arrangement of zeolite material (UZ8) loaded with a flavourant and encapsulated with a wax material (Ceridust 3610). The flavour delivery system was formed by entraining the flavour in the zeolite to from the core and then spray chilling the core with a wax material (Ceridust 3610) to form the encapsulated core or flavour delivery system. The core accounted for about 10% wt of the total weight of the first seven delivery systems. The last example had a 20% wt core loading in the shell material.

TABLE 4

| Shell material | core material | Core load |
|---|---|---|
| Ceridust 3610 | UZ8 loaded with 3-Methylbutanal | 10% |
| Ceridust 3610 | UZ8 loaded with Furfurylthiol | 10% |
| Ceridust 3610 | UZ8 loaded with Dimethyltrisulfide | 10% |
| Ceridust 3610 | UZ8 loaded with 2-Ethyl-3,5(6)-dimethylpyrazine | 10% |
| Ceridust 3610 | UZ8 loaded with Guajacol, 3-Ethylphenol, 4-isopropylphenol | 10% |
| Ceridust 3610 | UZ8 loaded with Standard Key | 10% |
| Ceridust 3610 | UZ8 loaded with Optimized Key | 10% |
| Ceridust 3610 | UZ8 loaded with Optimized Key | 20% |

These samples are then analyzed for particle size distribution, bulk density and morphology.

The particle size distribution is measured by laser diffraction method with the Malvern Mastersizer 2000. The liquid dispersion unit "Hydro MU" is used to measure the particles dispersed in ethanol. After the samples are dispersed in ethanol the ultrasonic bath is turned on for a period of 3 minutes to break the agglomerates. After 1 minute the measurement is initiated. All samples are measured twice and the average values are reported. The interpretation of the data is done according to the theory of Fraunhofer.

The Mastersizer breaks the agglomerates by using an ultrasonic batch prior to the particle size measurement; the particle size measured by laser diffraction method differs from the expected particle size of the sieved fractions. By sieving the samples, the agglomerates are not destroyed and the sieved fractions in fact consist of agglomerates rather than fractions of single particles.

Figure 6:
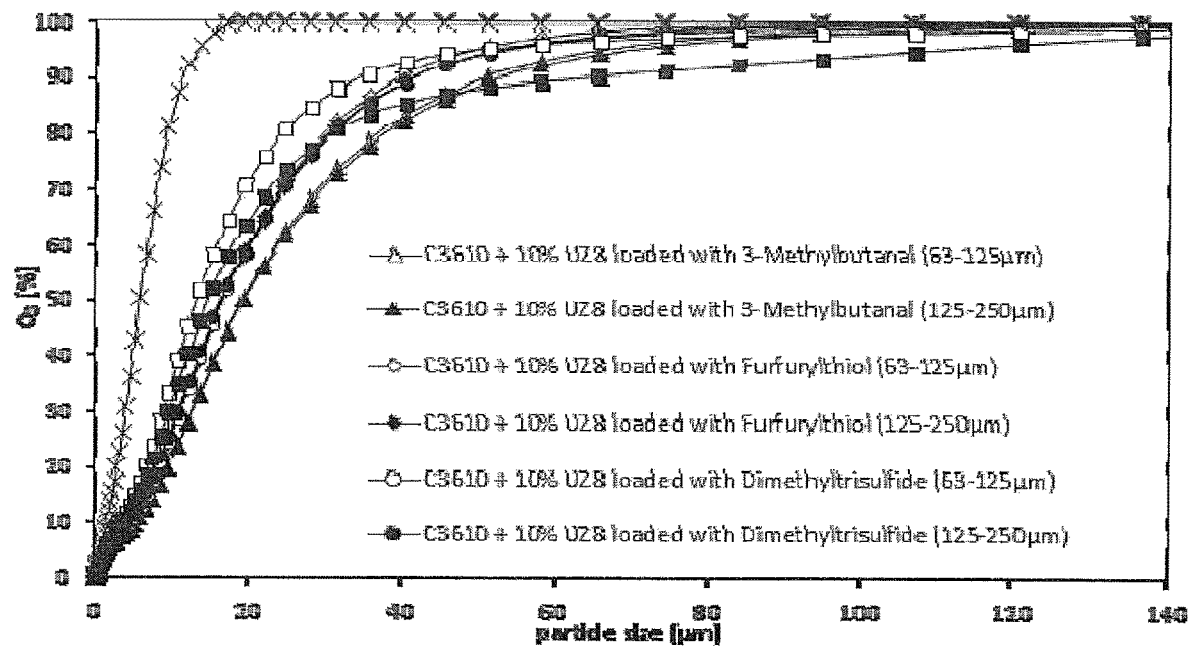
Figure 7:
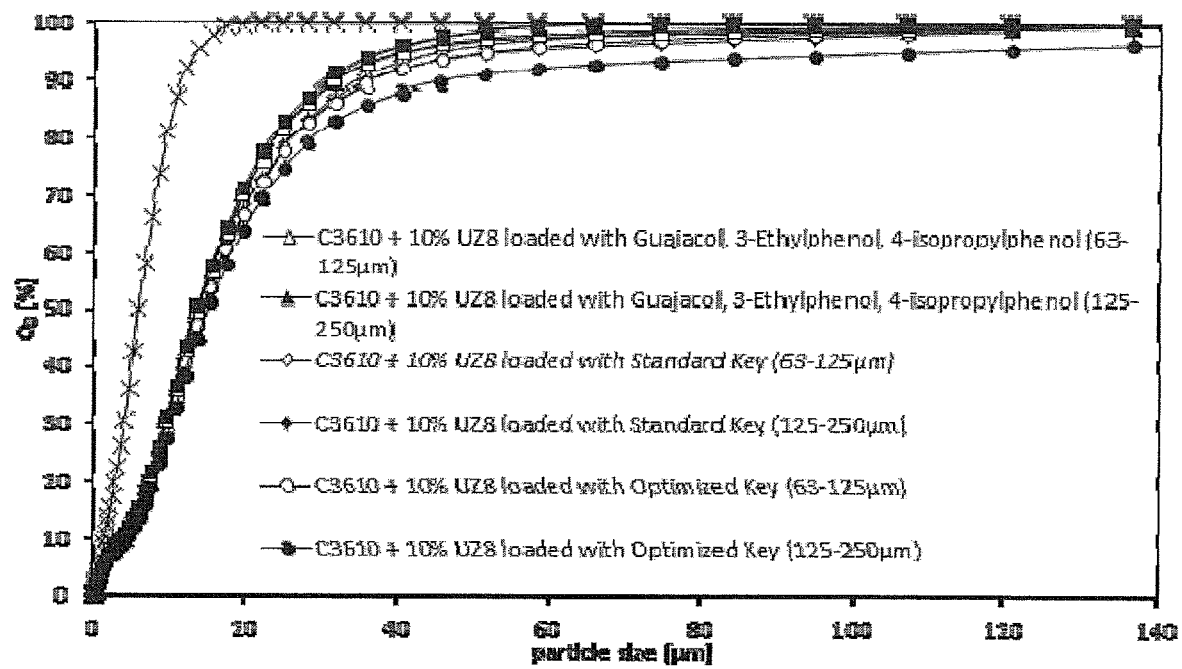

FIG. 6 and FIG. 7 report the particle size distributions of the core-shell samples of examples in Table 2 produced by the spray chilling process described above. Two particle size ranges (63-125 µm and 125-250 µm) are collected and tested for bulk density and flavour release below.

Figure 8:
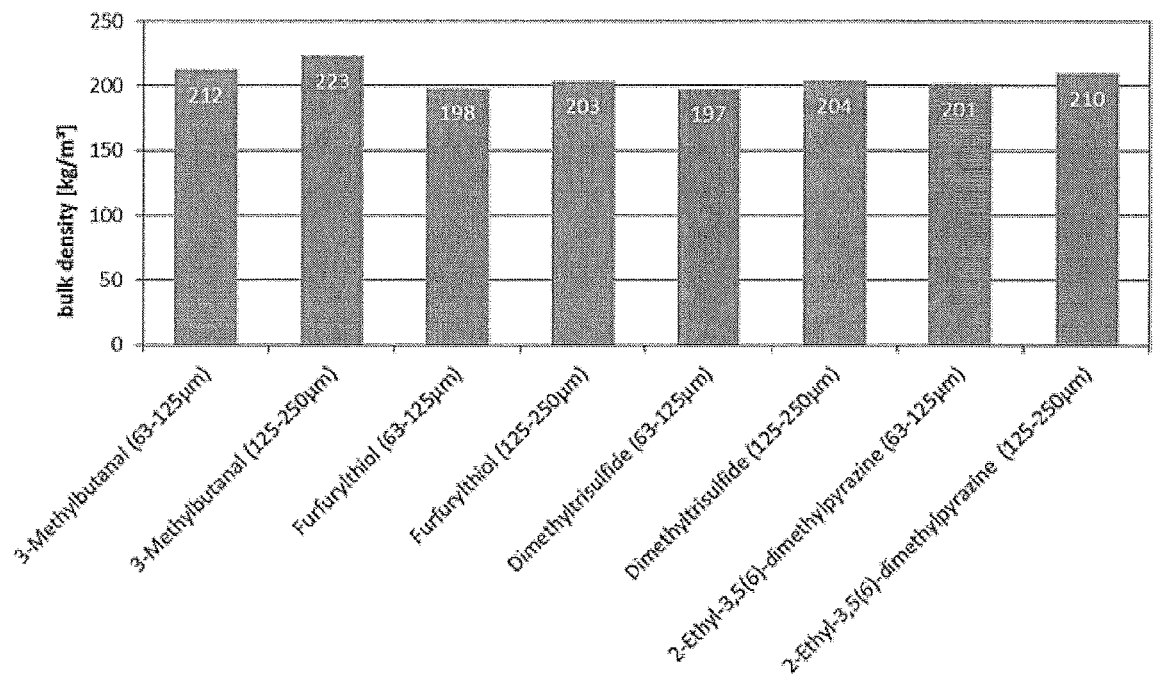
Figure 9:
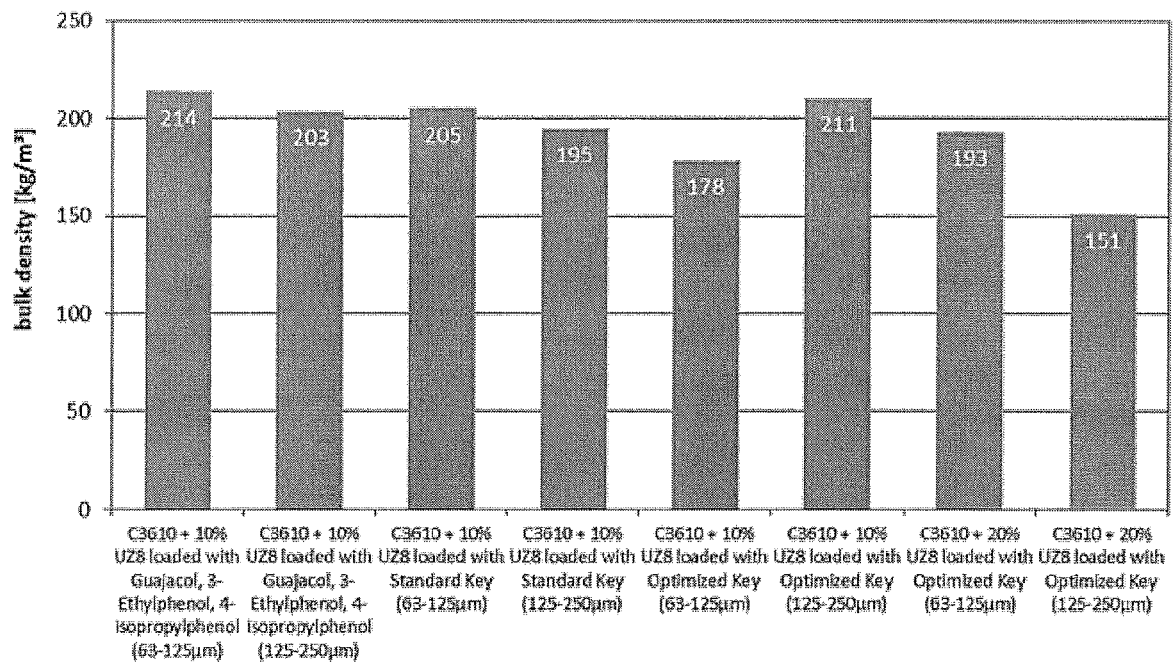

The bulk density of the core-shell samples of examples in Table 2 is measured in accordance to DIN ISO 697. In FIG. 8 and FIG. 9 the bulk densities are reported.

Figure 10:
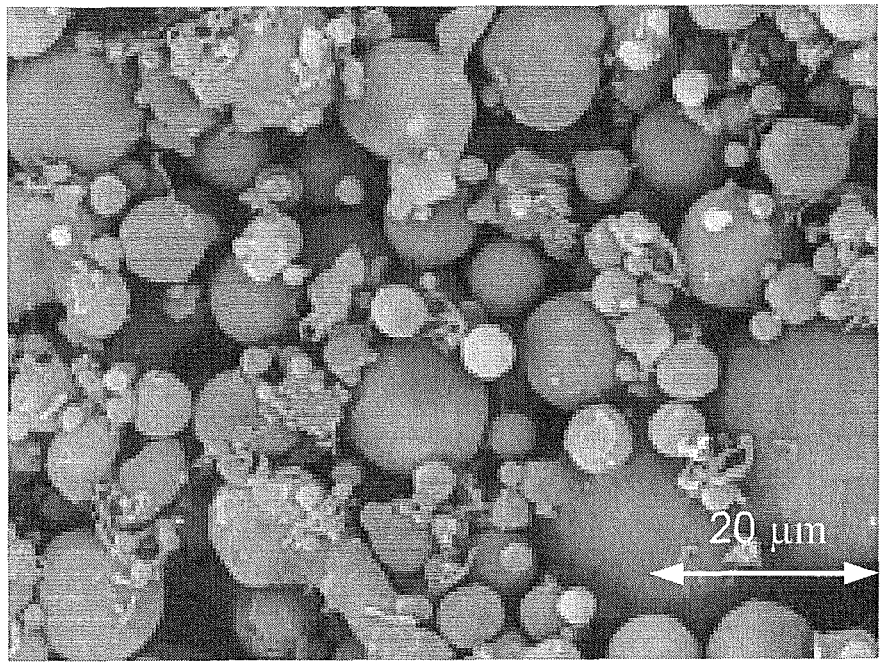
Figure 11:
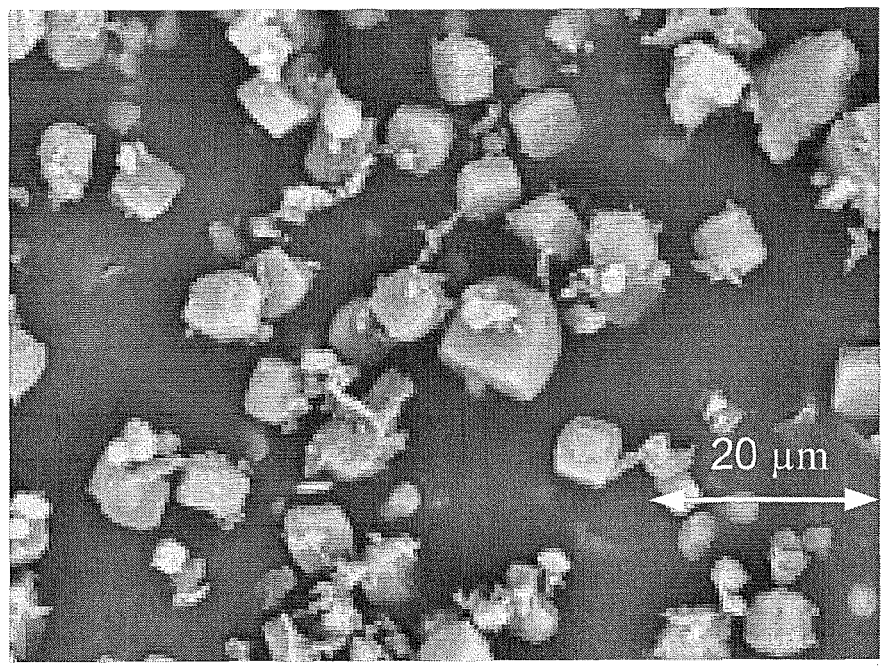
Figure 12:
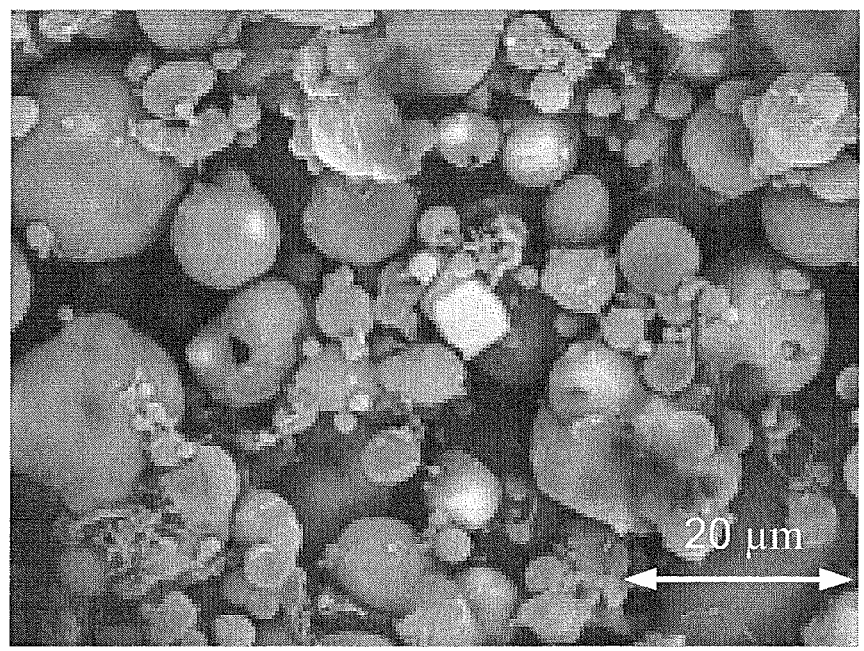

FIG. 10 shows a scanning electron microscope (SEM) pictures of pure spray chilled Ceridust C3610. FIG. 11 shows a scanning electron microscope (SEM) picture of pure unloaded zeolite UZ8. FIG. 12 shows a scanning electron microscope (SEM) picture of a flavour delivery system of Ceridust C3610+10% unloaded zeolite.

As illustrated in FIGS. 10-12 the shape of the pure sprayed Ceridust 3610 particles and the shape of the particles with the encapsulated zeolites are spherical and the surface is nearly smooth. In contrary to this, the particles of the pure unloaded zeolites are angular. In the bulk of the particles of the sprayed suspension of Ceridust 3610 and unloaded zeolites nearly no particle can be found which is angular, what an indicator is, that most of the zeolites are encapsulated in Ceridust 3610.

Flavour Release

The flavour release of the flavour delivery system described herein was then evaluated. A flavour delivery system described herein that was formed by impregnation of zeolites and subsequent spray chilling. The flavour delivery system was added to cast leaf slurry prior to cast leaf tobacco substrate generation at a level of 3% (w/w). The cast leaf was generated according to a standard cast-leaf procedure involving a drying step at approximately 100° C. No special observations were made during cast leaf manufacturing, indicating no to low flavour losses. Using the generated cast leaf, consumables (tobacco sticks) were manufactured to be used in the aerosol generating substrate.

Figure 13:
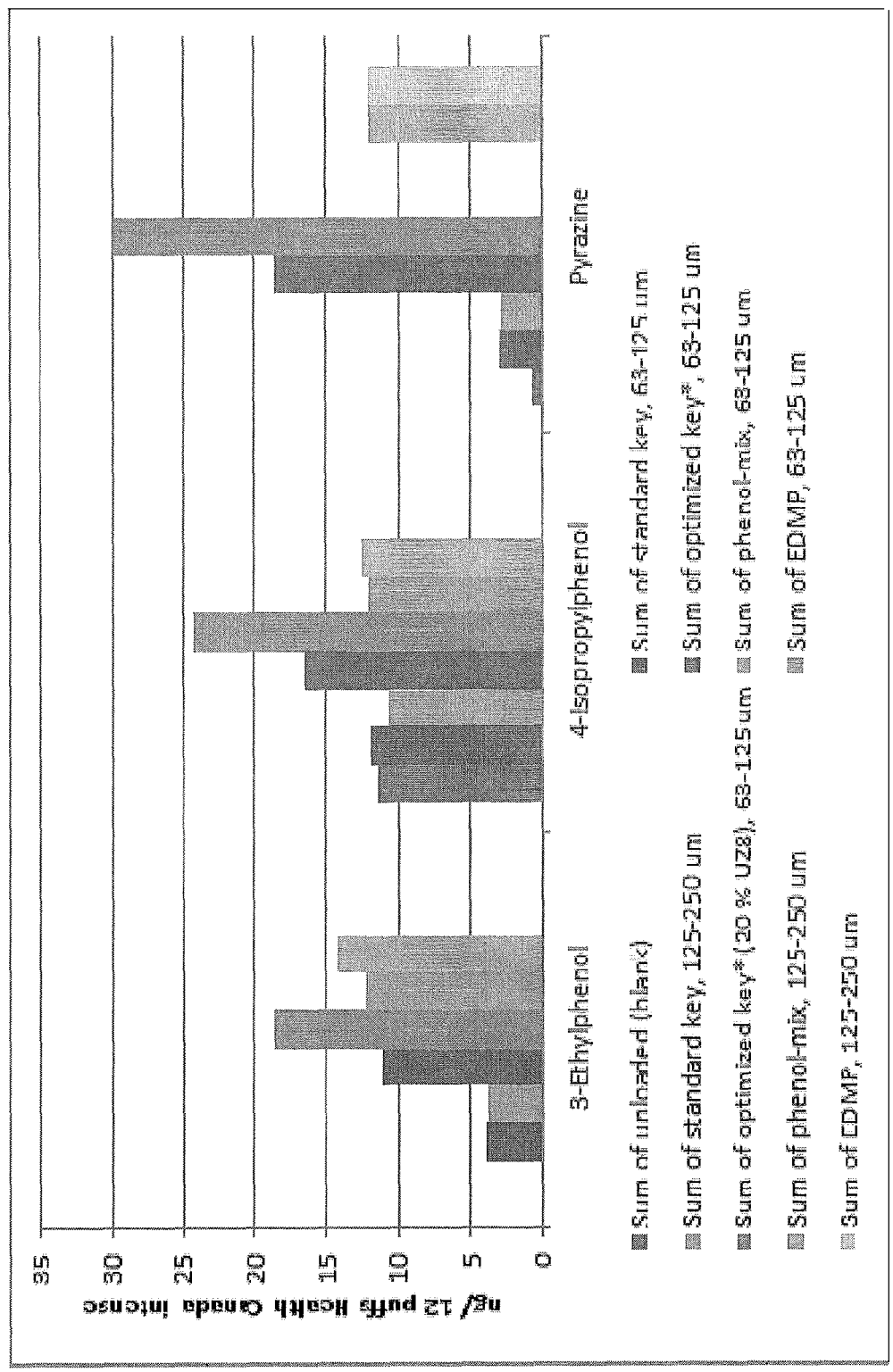

Flavour release analyses were performed by the Health Canada Intense Smoking Regime. The results are illustrated in FIG. 13.

The invention claimed is:

1. A flavour delivery system for tobacco comprising:
   a flavour material entrained in a zeolite material and forming a core comprising the flavour material and the zeolite,
   a wax material applied onto the core in molten form and surrounding the core and forming an encapsulated flavour particle,
   the core comprising from 1% to 50% of a total weight of the encapsulated flavour particle,
   wherein the encapsulated flavour particle has a particle size in a range from about 5 micrometres to about 80 micrometres, and the zeolite material has a particle size in a range from about 1 micrometer to about 20 micrometers.

2. A flavour delivery system according to claim 1, wherein the wax material has a melting point of about 100 degrees centigrade or greater.

3. A flavour delivery system according to claim 2, wherein the zeolite material is hydrophobic.

4. A flavour delivery system according to claim 1, wherein the zeolite material is hydrophobic.

5. A flavour delivery system according to claim 1, wherein the flavour material is a hydrophobic liquid.

6. A smoking composition comprising tobacco material and the flavour delivery system according to claim 1.

7. A smoking composition according to claim 6, wherein the tobacco material comprises homogenized tobacco.

8. A smoking composition according to claim 6, wherein the tobacco material comprises cast leaf tobacco.

9. A smoking composition according to claim 6, wherein at least a portion of the wax material is melted off the core and is dispersed within the tobacco material.

10. A smoking article comprising an aerosol forming substrate comprising the smoking composition of claim 6.

11. A smoking article comprising an aerosol forming substrate comprising the smoking composition of claim 9.

12. A method of forming a smoking composition comprising:
    combining tobacco material with the flavour delivery system according to claim 1 to form a tobacco mixture; and
    heating the tobacco mixture to form the smoking composition.

13. A method of forming a smoking composition according to claim 12, wherein the tobacco material comprises homogenized tobacco and water and the heating step removes at least a portion of the water from the tobacco mixture to form the smoking composition.

14. A method of forming a smoking composition according to claim 13, wherein the heating step melts at least a portion of the wax material.

15. A method of forming a smoking composition according to claim 12, wherein the heating step melts at least a portion of the wax material.

16. A method of forming a smoking composition according to claim 12, wherein the heating step does not melt the wax material.

* * * * *